United States Patent Office 3,380,542
Patented Apr. 30, 1968

3,380,542
RESTORING LOST CIRCULATION IN A WELL DRILLED WITH AN OIL BASE DRILLING FLUID
Elmer E. Clear, Bartlesville, Okla., assignor to Phillips Petroleum Company, a corporation of Delaware
No Drawing. Filed Feb. 21, 1966, Ser. No. 528,807
6 Claims. (Cl. 175—72)

ABSTRACT OF THE DISCLOSURE

Oil-base drilling fluid, containing a slurry of diatomite and asbestos, is used to restore lost circulation during well drilling operations.

---

This invention relates to a method for restoring lost circulation in a well being drilled with an oil-base drilling fluid which includes substantially water-free drilling fluids and water-in-oil emulsion drilling fluids. In one aspect this invention relates to a novel slurry of diatomite and asbestos in oil.

When drilling through porous or fractured formations or other formations having a relatively high porosity or permeability to the drilling fluid it sometimes occurs that the drilling fluid is lost to the formation and a condition referred to as lost circulation obtains wherein the drilling fluid passes into the formation at such rate that circulation is greatly reduced or even terminated. In such case the drilling of the well must be stopped and the condition corrected before drilling can be continued again. If the condition of lost circulation cannot be corrected, it is then necessary to abandon the well.

Various methods and means in the past have been employed to restore circulation of the drilling fluid when a lost circulation condition has occurred and such methods usually entail the addition to the drilling mud of fibrous materials to form a mat upon which a mud sheath can be deposited. Almost all known fibrous materials have been used in drilling fluid compositions to seal the thief formation in attempts to restore circulation of the drilling fluid when a lost circulation condition has been encountered.

It is an object of this invention to provide a method for sealing a thief formation to correct a lost circulation condition in a well being drilled with an oil-base drilling fluid. It is also an object of this invention to provide a slurry of solids in oil which can be employed to correct lost circulation encountered in a well drilled with an oil-base drilling fluid.

Still another object of this invention is to provide a composition which will form a stable slurry in oil having extremely high oil loss properties. A method for forming an oil permeable mat on the surface of a thief formation with the application of a minimum amount of hydrostatic pressure on the formation is still another object of this invention. Other objects and advantages of this invention will be apparent to one skilled in the art upon reading this disclosure including the detailed description of the invention.

Broadly, the invention contemplates the formation of an extremely high fluid loss, oil slurry of diatomite with a sufficient amount of asbestos to form a stable system, and then spotting a slug or pill of this slurry at the locus of the thief formation and then deoiling the slurry by forcing the oil from the slurry into the thief formation by increasing the hydrostatic head on the slurry. Upon completion of deoiling of the slurry, oil base drilling fluid is then circulated through the well bore to form a mud sheath on the high oil loss filter cake that has been squeezed into the surface of the thief formation.

The thief formation will usually be at or near the bottom of the well bore because when the porous formation is encountered, it will immediately begin to take drilling fluid and the loss of drilling fluid will usually increase as the porous formation is penetrated. In such situations the high oil loss slurry can be spotted at the locus of the thief formation by pumping a slug of the slurry down and out of the drill pipe. It may be, however, that the thief formation is at a point further up in the well bore and such condition can result from failure of the previous seal, in which case the drill pipe can be raised so that the slug of high oil loss slurry can be deposited at the locus of the thief formation from the lower end of the drill pipe.

The combination of diatomite and asbestos has been used to restore lost circulation in aqueous drilling systems, and it is surprising that this combination is also operable in an oil base system. Normally additives for water base well working fluids cannot be used in oil base well working fluids, and oil base additives usually are inoperative in water base well working fluids. Materials which are used to viscosify oil base fluids such as asphaltic materials usually decrease the fluid loss properties of such fluids. Asbestos, however, is capable of viscosifying oil as well as water and actually increases the fluid loss properties of such systems.

Diatomite is also known as diatomaceous earth, infusorial earth, or kieselguhr and is composed of the silicified skeletons of diatoms. Diatomite is abundantly available and relatively inexpensive. Oil slurries of diatomite for use as the high fluid loss slurries of my invention will usually contain from 10 to 60 pounds of diatomite per barrel of slurry. The slurry can, however, contain more or less diatomite so long as the slurry is pumpable.

The asbestos used in my composition can be any chrysotile asbestos which will form a pumpable slurry in oil. For reasons of economy asbestos which has been sufficiently ground to pass a U.S. standard 16 mesh screen or which corresponds to Group 7 according to the Quebec Screen Test adopted by the Quebec Asbestos Producers Association will often be preferred. A particularly preferred asbestos is California asbestos identified as Coalinga and obtained from the Johns-Manville Company. The amount of asbestos employed to stabilize an oil slurry of diatomite will generally be in the range of about 1 to 15 pounds per barrel of slurry. The ratio of diatomite to asbestos will usually be from about 5:1 to about 20:1.

It may sometimes be desirable to add a conventional lost circulation material such as sugar cane bagasse, cottonseed hulls, and the like to the slurry of the invention, particularly if the voids or pores of the thief formation are relatively large or believed to be relatively large. Weighting materials such as barite, limestone, iron oxide, and the like can be incorporated in the slurry if a weighted drilling fluid is being employed. Slurries can be made having densities up to 18 pounds per gallon or even higher.

The oil used in the preparation of the lost circulation slurry will usually be the same as that of the oil base drilling fluid being used at the well. Diesel oil is commonly used for the oil in an oil base drilling fluid and is well suited for the preparation of the lost circulation slurry. Crude oil can be used but should be pilot tested first because crude oil usually contains small amounts of water as a contaminant, and even small amounts of water in such slurry will result in an excessive increase in viscosity of the slurry. The same precautions taken to keep water out of an oil base drilling fluid should be exercised with the lost circulation slurry of the present invention. A water-in-oil emulsion can be utilized in the present invention and the viscosity of the slurry can be controlled by the addition of oil to reduce the viscosity and the addition of water to increase the viscosity.

The following example will be helpful in attaining an understanding of the invention, but should not be construed to limit the invention unduly.

Example

California asbestos identified as Coalinga and Canadian asbestos of Group 7 according to the Quebec Screen Test were employed in the following runs. The diatomite and asbestos were slurried in diesel oil and tested according to "Recommended Practice on Standard Field Procedures for Testing Drilling Fluids," A.P.I. Code #RP 13B (1962).

TABLE.—COMPARISON OF COALINGA AND CANADIAN ASBESTOS IN DIATOMITE-OIL LOST CIRCULATION SLURRIES

| Asbestos, lb./bbl. | Plastic Viscosity, cp. | Yield Point, lb./100 sq. ft. | API Oil Loss, ml. (calc.) |
|---|---|---|---|
| Part A—Unweighted systems: 44 lb./bbl. diatomite | | | |
| Coalinga: | | | |
| 4 | 11 | 61 | 915 |
| 5 | 14 | 60 | 947 |
| 6 | 10 | 65 | 1,010 |
| 7TF1 Canadian: | | | |
| 4 | 9 | 61 | 1,065 |
| 5 | 7 | 65 | 1,085 |
| 6 | 15 | 65 | 958 |
| Part B—Weighted systems: 30 lb./bbl. diatomite and 250 lb./bbl. barite [All systems were too thick to measure the viscosity] | | | |
| Coalinga: | | | |
| 2.75 | | | 505 |
| 3.25 | | | 564 |
| 3.75 | | | 620 |
| 7TF1 Canadian: | | | |
| 2.75 | | | 593 |
| 3.25 | | | 587 |
| 3.75 | | | 630 |

The data in the above table show that diatomite suspended in oil with asbestos provides an extremely high oil loss system. The above slurries displayed little tendency to settle and all of the slurries were pumpable even though the weighted samples were quite viscous.

That which is claimed is:

1. The method of restoring lost circulation in a drilling well wherein an oil-base drilling fluid is utilized which comprises preparing a slurry of diatomite in oil and a sufficient amount of asbestos to suspend the diatomite in the oil; introducing said slurry into said well; positioning said slurry at the locus of circulation loss; applying sufficient hydrostatic pressure to said slurry to urge said slurry into the locus of lost circulation and to deoil said slurry; and circulating oil-base drilling fluid through said well.

2. The method of claim 1 wherein the oil is the same as that of the oil-base drilling fluid.

3. The method of claim 1 wherein the oil is diesel oil.

4. The method of claim 1 wherein the slurry is prepared by adding diatomite in an amount of about 10 to 60 pounds per barrel of slurry; and asbestos in the amount of about 1 to 15 pounds per barrel of slurry.

5. The slurry of diatomite and asbestos in oil prepared according to the method of claim 4.

6. The slurry of claim 5 wherein the ratio of diatomite to asbestos in the slurry is about 10:1.

References Cited

UNITED STATES PATENTS 3,253,664   5/1966   Sauber et al. _____ 175—72

ERNEST R. PURSER, *Primary Examiner.*